(12) United States Patent
Wasser et al.

(10) Patent No.: US 11,474,622 B1
(45) Date of Patent: Oct. 18, 2022

(54) PERSONAL STYLUS DEVICE AND DISPENSER AND METHOD THEREFOR

(71) Applicants: Scott Wasser, Green Lane, PA (US); Colin Henderson, Califon, NJ (US)

(72) Inventors: Scott Wasser, Green Lane, PA (US); Colin Henderson, Califon, NJ (US)

( * ) Notice: Subject to any disclaimer, the term of this patent is extended or adjusted under 35 U.S.C. 154(b) by 0 days.

(21) Appl. No.: 17/326,321

(22) Filed: May 20, 2021

(51) Int. Cl.
*G06F 3/0354* (2013.01)

(52) U.S. Cl.
CPC ................ *G06F 3/03545* (2013.01)

(58) Field of Classification Search
CPC .................................................. G06F 3/03545
See application file for complete search history.

(56) References Cited

U.S. PATENT DOCUMENTS

| | | | | |
|---|---|---|---|---|
| 2002/0111283 A1* | 8/2002 | Argentieri | ............ | C11D 1/004 510/168 |
| 2002/0183225 A1* | 12/2002 | Goldoni | ................ | C11D 1/825 510/267 |
| 2003/0004087 A1* | 1/2003 | Goldoni | ............... | C11D 17/041 510/475 |
| 2012/0298683 A1* | 11/2012 | Domit | ................. | A47G 21/184 221/1 |
| 2013/0141397 A1* | 6/2013 | Dunagan | ............. | G06F 3/03545 345/179 |
| 2013/0327357 A1* | 12/2013 | Muhr-Sweeney | ........ | B08B 1/00 15/118 |
| 2015/0313395 A1* | 11/2015 | Stone | ................... | A47G 21/184 221/192 |
| 2017/0340153 A1* | 11/2017 | Wise-Jarvis | ............. | A61L 2/10 |
| 2021/0311571 A1* | 10/2021 | Roensch | ............ | G06F 3/03545 |
| 2021/0333896 A1* | 10/2021 | Rementeria | ......... | G06F 3/03545 |

FOREIGN PATENT DOCUMENTS

CN           112009880 A    * 12/2020    ................ A61J 1/05

* cited by examiner

*Primary Examiner* — Carolyn R Edwards
(74) *Attorney, Agent, or Firm* — Matthew J. Hodulik (57) ABSTRACT

The FreeStylus device is a simple solution embodying an effective design. The stylus consists of two main parts, a cardboard tube and a rubber tip. The cardboard tube is constructed of four layers and acts as the core structure of the stylus. The outermost layer is designed to be smooth and visually appealing. The following inner two layers of cardboard are thicker and act as the main structure of the tube. An extremely thin sheet of aluminum foil is the final layer. The aluminum foil layer acts as an excellent conductor for consistent touch sensitivity. Contacting this foil layer and pressed into the end of the tube is a silicone tip. This combination is ideal for transferring the user's electromagnetic field to the touch screen. With this silicone tip, consistent and crisp operation is easily attainable regardless of the touch screen.

23 Claims, 6 Drawing Sheets

PERSONAL STYLUS DEVICE AND DISPENSER AND METHOD THEREFOR

RELATED APPLICATIONS

The present application is related to Provisional Patent Applications U.S. Ser. No. 63/029,471, entitled Method and Apparatus for providing Safe Contact with a Touch Activated Technology Surface, having a filing date of May 23, 2020, and U.S. Ser. No. 63/113,175, entitled Personal Stylus Device and Dispenser and Method therefor, having a filing date of Nov. 12, 2020, the subject matter of which applications is incorporated herein by reference.

BACKGROUND

Humanity has embraced touch technology for endless applications because it has proven to be very efficient. In a post SARS-COV-2 world, however, touch technology has become a vulnerability. The global pandemic has seen a rise in the utilization of Personal Protective Equipment (PPE) in order to slow the spread of the COVID-19 virus. Accordingly, there is a need for PPE that is safe and easy to use in connection with touch technology.

SUMMARY

The present invention FreeStylus™ stylus device is an eco-friendly, disposable one time use stylus that can be used with a touchless dispenser compatible with any interactive touch technology. The FreeStylus device has been developed to slow the spread of bacteria by providing a hygienic, touch-free alternative to interactive public surfaces. Humanity has embraced touch technology for endless applications because it has proven to be very efficient. In a post SARS-COV-2 world, however, touch technology has become a vulnerability. The FreeStylus is used as personal protective equipment (PPE) for the consumer. Touch interactive surface locations are provided with a touchless dispenser that dispenses a one-time use eco-friendly stylus for an individual to use. The dispenser houses a bulk quantity of FreeStylus devices and is provided in two forms—motor driven and an elastic energy system—to dispense a new stylus after a stylus is taken by a user. The FreeStylus device is sturdy enough to be used on touch screens and physical hard keys/buttons. Relevant applications for the FreeStylus include (but are not limited to) Kiosks, Vending, Payment Terminals, ATMs, Elevators, Voting booths and Tablets.

The FreeStylus device is a simple solution embodying an effective design. The stylus consists of two main parts, a cardboard tube and a rubber tip. The cardboard tube is constructed of four layers and acts as the core structure of the stylus. The outermost layer is designed to be smooth and visually appealing. The following inner two layers of cardboard are thicker and act as the main structure of the tube. An extremely thin sheet of aluminum foil is the final layer. The aluminum foil layer acts as an excellent conductor for consistent touch sensitivity. Contacting this foil layer and pressed into the end of the tube is a silicone tip. This combination is ideal for transferring the user's electromagnetic field to the touch screen. With this silicone tip, consistent and crisp operation is easily attainable regardless of the touch screen.

The FreeStylus is dispensed by two different types of dispensers. The first type of system is a motor driven mechanism that is triggered by a sensor. This mechanism is composed of a gear train powered by a small motor. The styluses sit above the main rotator gear and when triggered by a hand wave the main gear rotates and a single stylus is ejected and rolls down a ramp into a tray that is easily accessed by a consumer. The second type is an elastic potential energy system. This system utilizes springs and a gradual slope to position the stylus in a covered but easily reachable position, where the force of each withdrawn stylus powers the next stylus to take its place. The first step in success for both systems is a clean loading process. With proper PPE a sanitized package of styluses is poured into the top of the dispenser. The styluses are then in a completely contained area. Both distribution systems use the same stylus and mounts. The mounting systems paired with these dispensers allow them to be positioned in any type of environment.

BRIEF DESCRIPTION OF THE DRAWINGS

The present disclosure is illustrated by way of example, and not of limitation, in the figures of the accompanying drawings in which.

DETAILED DESCRIPTION

Figure 1:
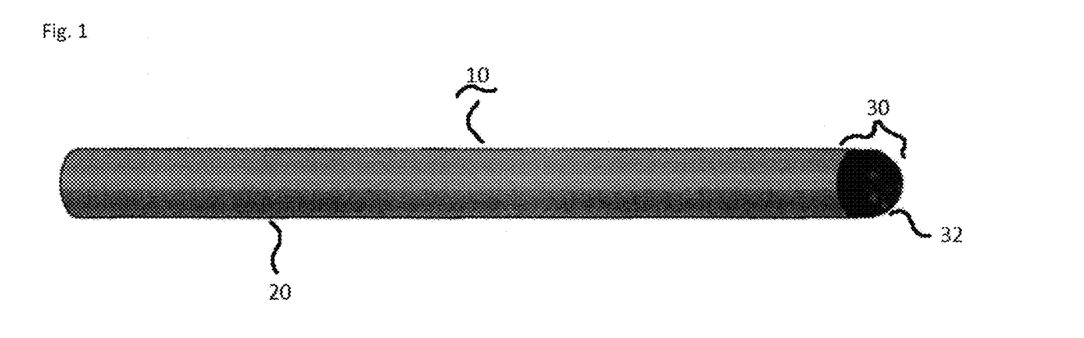
FIG. 1 is one embodiment of an assembled stylus according to the present invention.

Referring to FIG. 1, there is shown one exemplary embodiment of a single use stylus 10 according to the present invention. As shown, the stylus 10 is made up of two main components, a hollow cylindrical stylus body 20 and a stylus tip 30. The tip includes a rounded portion 32 transitioning into a recessed body (not shown).

Figure 2:
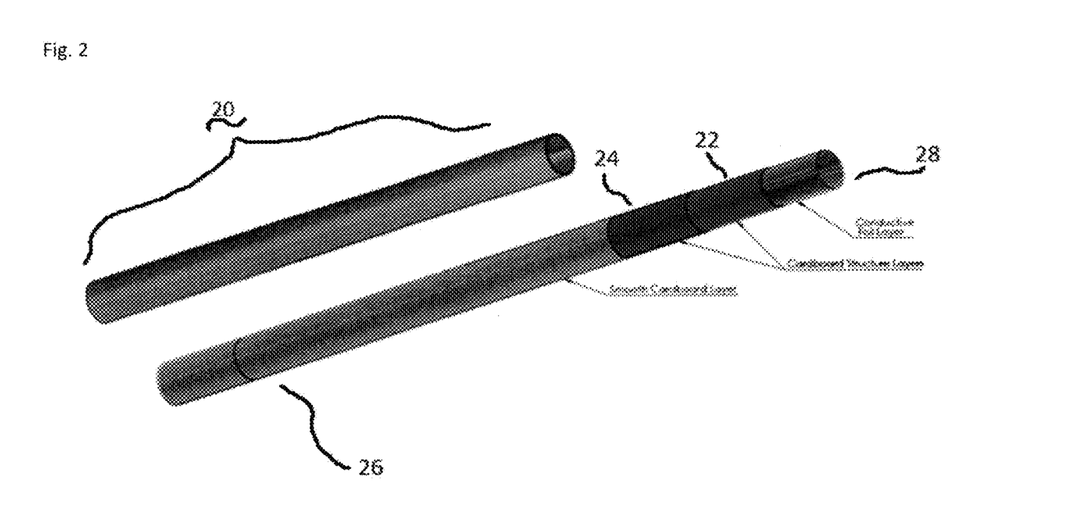
FIG. 2 is an assembly drawing of the stylus body and a fully assemble stylus body according to one embodiment.

Referring to FIG. 2, an assembly drawing of the stylus body 20 is shown. In one exemplary embodiment, the stylus body includes a first cardboard structural layer 22 formed into a hollow cylinder and a second cardboard structural layer 24 formed directly over the first cardboard layer. The first and second layers 22, 24 give the body structural rigidity and essentially provide the foundation for the stylus body. In one exemplary embodiment, the structural layers have an approximate thickness of 0.005 inches. A third finish layer 26 is applied on the outside of the two structural layers 22, 24. In the exemplary embodiment, the finish layer 26 is a smooth cardboard layer 0.002 inches thick which enables the stylus to achieve a finished, visually appealing look. All of the layers of the stylus body are adhered to one another via a thin layer of liquid adhesive/glue suitable for adhering thin cardboard layers. In one embodiment, the assembly process is machine automated where each of the cardboard layers passes through a tray of liquid glue before being spun into a complete tube. This yields a tightly wrapped tube that utilizes relatively small amounts of glue. A thin metal layer 28 is the final layer contained within the stylus body. The metal layer 28 is the innermost layer of the stylus body 20 and is adjacent to the first structural layer 22. The metal layer 28 is a conductive layer which increases the conductivity of the stylus body 20 and, therefore, the sensitivity of the stylus 10 itself in relation to touch screen operation. The metal layer 28 is made up of a thin sheet of aluminum foil having a thickness of 0.001 inches, but could also be made up of other like conductive materials, e.g., copper, silver, gold, zinc, nickel, brass, bronze, iron, platinum, steel, lead, and stainless steel. In one embodiment, the metal layer is applied as part of the automated spin assembly. In other embodiments, the metal layer is added after the cardboard tube has been assembled. When assembled the stylus body has an inner diameter of approximately 0.249 inches and an outer diameter of 0.275 inches. The length of the stylus body in one exemplary embodiment is 3.53 inches. Although the stylus body is described as being made substantially of cardboard, it would be understood to those skilled in the art that other lightweight biodegradable materials could also be used, such as bamboo, other kinds of paper stock, and wood. The thickness of each layer may also be altered depending on specific applications of the stylus.

Figures 3A, 3B:
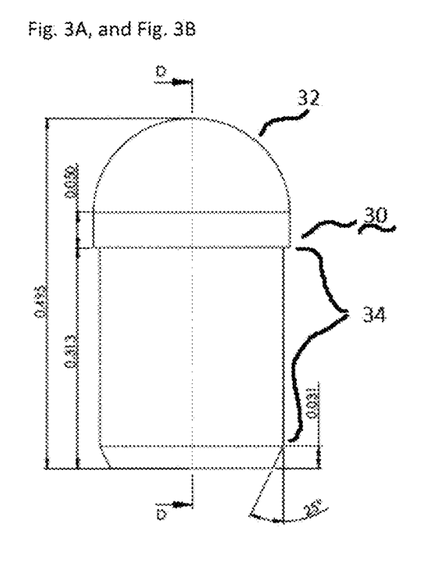
FIG. 3A is a side view of the stylus tip.
FIG. 3B is sectional view of the stylus tip according to an embodiment.
Figure 3B:
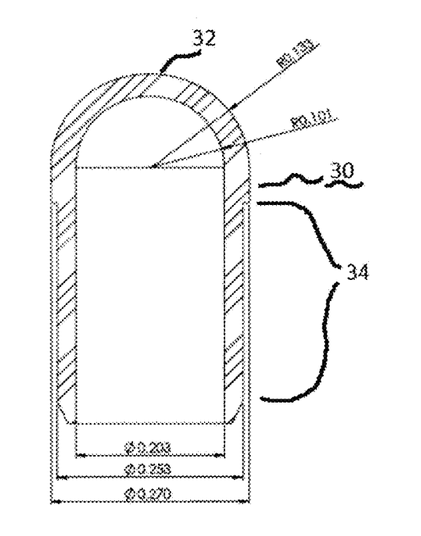

The stylus tip 30, referring to FIGS. 3A and 3B, is made of a conductive silicone material. FIG. 3A is a side view of the stylus tip 30 and FIG. 3B is a section view of the stylus tip along section lines D-D. In one exemplary embodiment, the tip has a resistivity in ohm meters of 2300. As shown, the total length of the tip 30 is 0.495 inches, where the body portion 34 is 0.313 inches. The thickness of the tip is roughly 0.050 inches in the body portion and 0.067 inches at the tip portion. The stylus tip has a touch tip radius of between 0.120 and 0.140 inches. This radius is designed for crisp contact on touchscreens of varying resolution. In one exemplary embodiment, a body portion 34 of the stylus tip has an outer diameter of 0.270 inches and an inner diameter of 0.203 inches.

Figure 4:
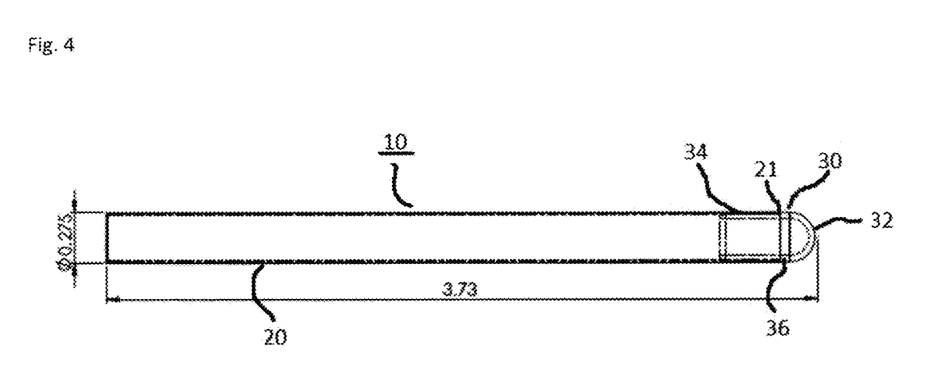
FIG. 4 is a sectional view of an assembled stylus according to an embodiment.
Figure 5:
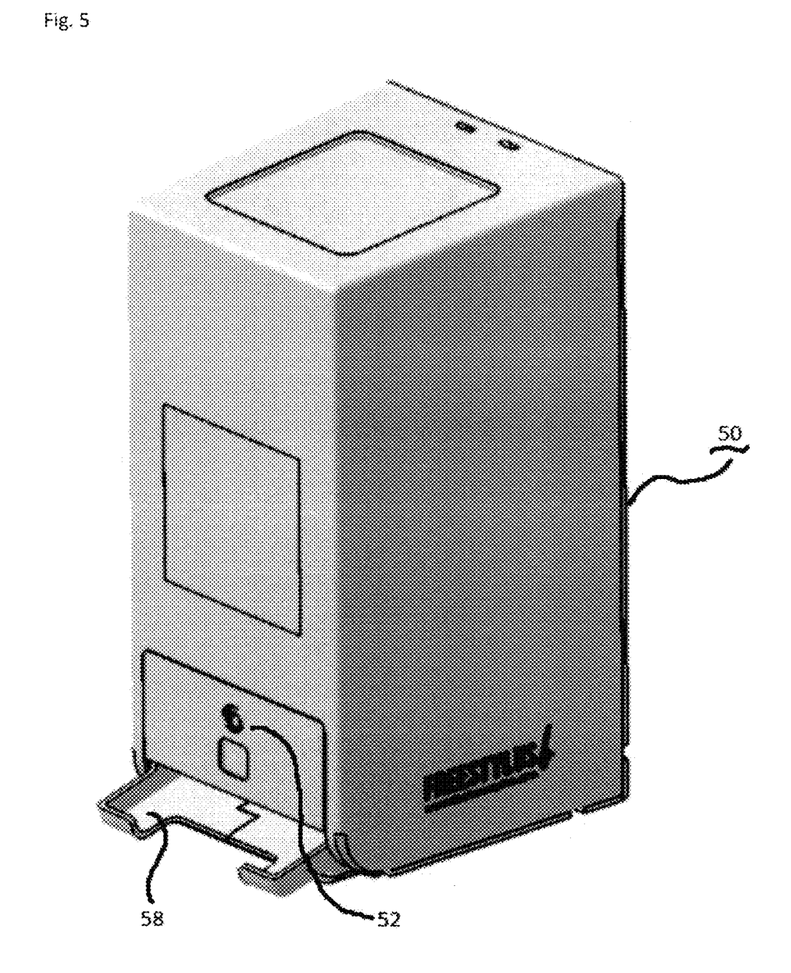
FIGS. 5-8 show various views of one embodiment of a dispenser according to the invention.
Figure 6:
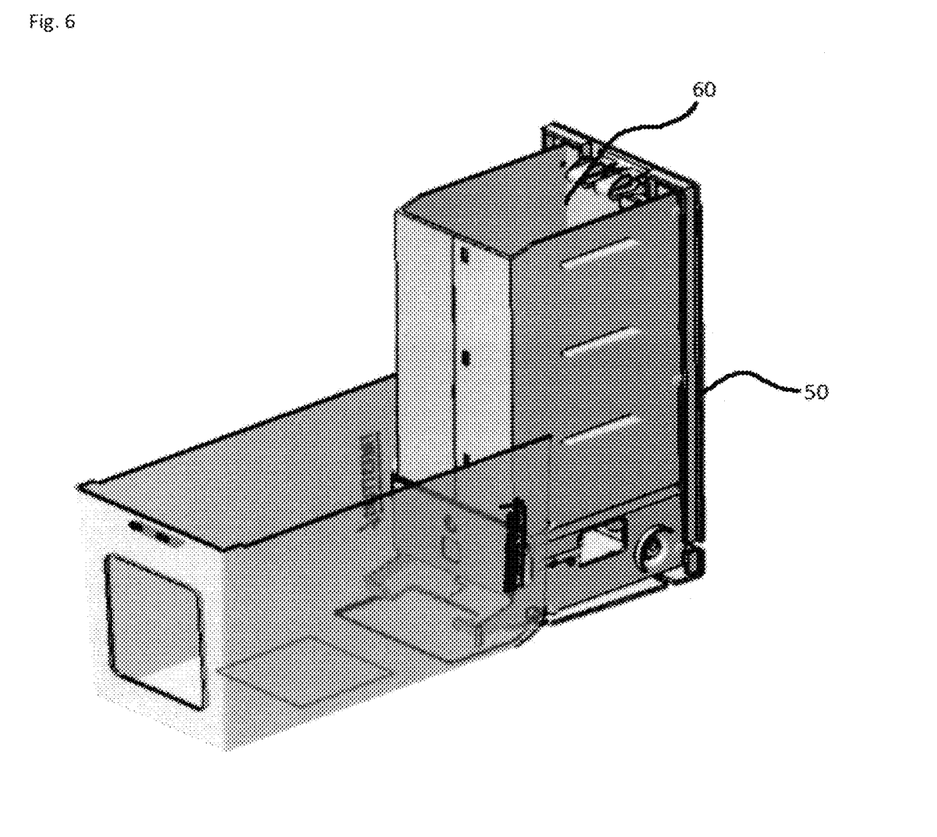
Figure 7:
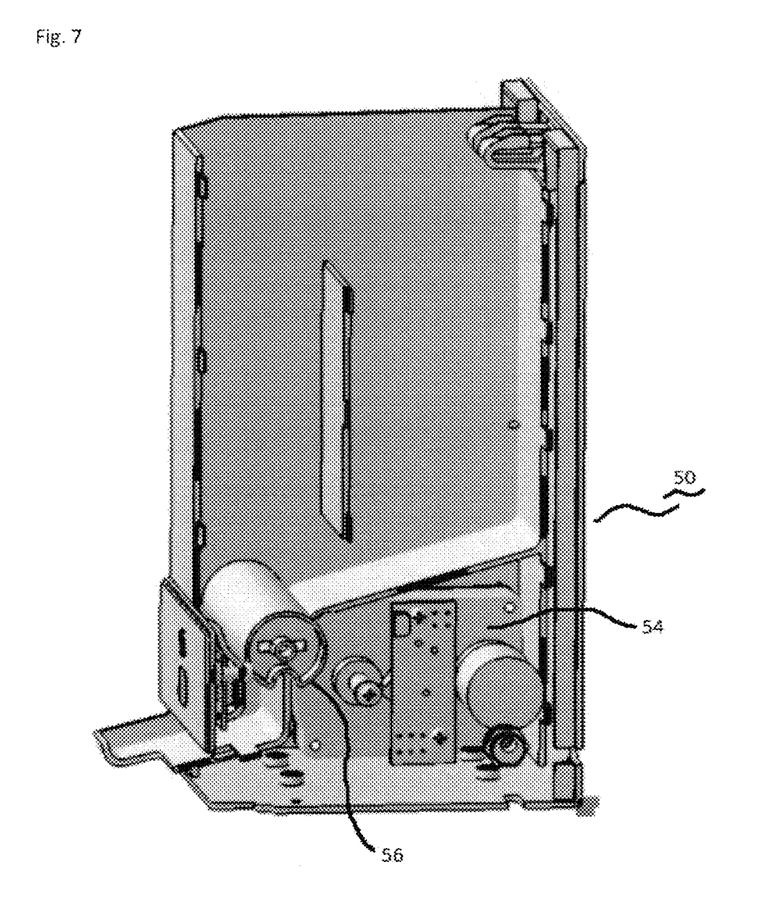
Figure 8:
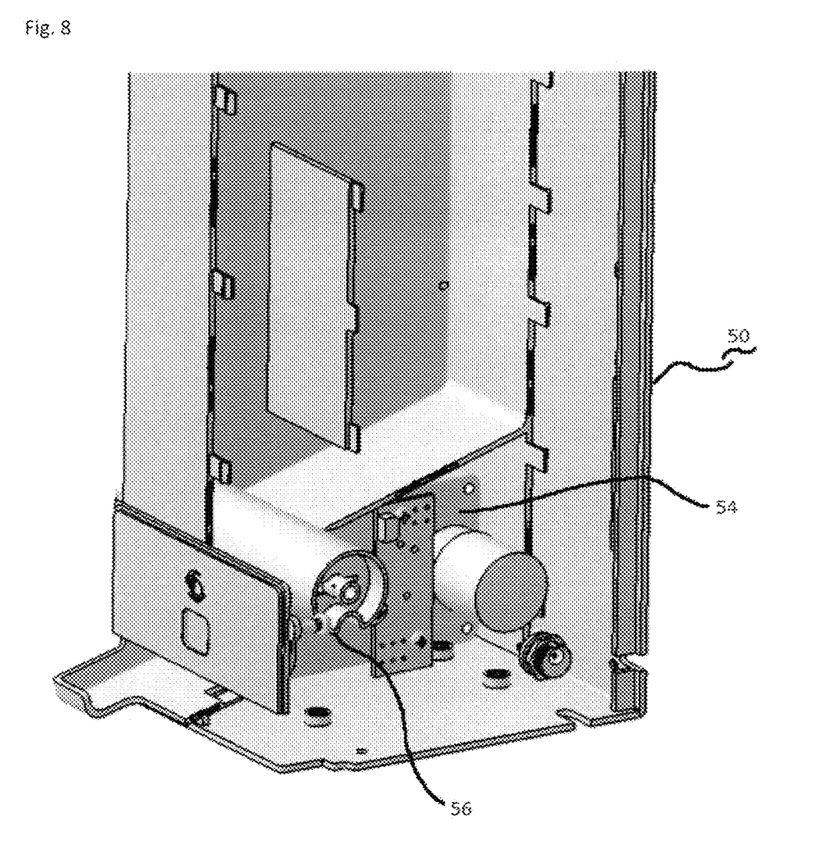

Referring now to FIG. 4, when assembled, the body portion 34 of the tip 30 is press fit securely within one end of the hollow stylus body 20 and may be secured by an adhesive, e.g., a minuscule layer of glue.

A rear section 36 of the rounded portion 32 of the tip 30 contacts a first end edge 21 of the stylus body 20 while the body portion 34 of the tip is seated within the inside of the stylus body contacting the thin metal layer. The stylus body 20 and the stylus tip 30 assembly make for a strong and lightweight device that has a relatively low-cost structure of materials and is inexpensive to manufacture. In addition, the present invention stylus is made up mainly of biodegradable materials and thus has an excellent sustainability footprint. This combination makes the present invention stylus an excellent one time use device that can be supplied, for example, at public point of sale or other type locations where touch screen technology is employed. Use of one-time personal stylus devices will assist in lessening the spread of germs and bacteria associated with multi-user touch platforms.

A significant feature of the stylus device is the inclusion of the conductive foil layer within the stylus body. When the stylus is assembled, the stylus tip contacts and electrically couples to the foil layer of the stylus body. This allows for significant operational improvement with regard to touchscreen sensitivity as compared to stylus units not including the conductive metal layer. The conductive metal layer within the stylus enables a capacitive change produced, for example, by a direct human interaction with a touchscreen to be more effectively transferred to the touchscreen surface by way of the stylus. Table 1 shows a record of the resistance variations between a stylus made up of three cardboard layers plus a spiral of graphene paint and a stylus tip versus the above-described stylus including the inside metal layer. Resistance measurements were taken using probes attached at the end of the stylus tip and the end of the stylus body opposite the tip. As can be seen from Table 1 below, the stylus device including the stylus body having the metal layer produces much less electrical resistance within the measured circuit than the stylus body without the metal layer. This lesser electrical resistance is indicative of improved electrical conductance for the stylus device of the present invention as used in connection with today's touchscreen devices.

TABLE 1

| Stylus A: | Aluminum Foil (adhered to cardboard) + Silicone Tip |
| Stylus B: | Graphene Paint (painted on cardboard) + Silicone Tip |
| Test 1: | |
| Resistance Through Stylus A (kohms): | 3.175 |
| Resistance Through Stylus B (kohms): | 31.82 |
| Test 2 (different styluses): | |
| Resistance Through Stylus A (kohms): | 3.035 |
| Resistance Through Stylus B (kohms): | 35.56 |

The stylus 10 is dispensed in two different types of dispensers. Referring to FIG. 5 through 8 in combination, the first type of dispenser system 50 is a motor driven mechanism that is triggered by a sensor 52. Example sensors may include, but not be limited to: infrared, keyword voice and various motion activated type sensors. This mechanism is composed of a gear train powered off a small motor 54, for example, a DC motor. The styluses sit above the main rotator gear 56 and when triggered by a hand wave, for example, the main gear 56 rotates and a single stylus is ejected and rolls down a ramp into a tray 58 that is easily accessed by the consumer. As would be understood by a person skilled in the art, the dispenser including the DC motor may be battery powered. Alternatively, the dispenser may include an AC motor and be plugged in to a standard wall outlet for power.

The second type is an elastic potential energy system. This system utilizes springs and a gradual slope to position the stylus in a covered but easily reachable position. Where the force of each stylus withdrawn powers the next one to take its place.

More specifically a spring-loaded follower pushes a line of styluses up to an exit opening. The tension of the spring keeps the stylus from dropping down into the exit opening until the second spring is actuated. The second spring holds an interference trap door closed. When initially loaded the trap door is held open from behind, to allow the initial stylus to start the chain reaction. This door is pushed open when a stylus is pulled from the opening, and when it shuts, it separates the next stylus front the ones under load, thus allowing it to fall into the opening below.

The first step in success for both systems is a clean loading process. With proper PPE a sanitized package of styluses is poured into the top 60 of the dispenser 50. The styluses are then in a completely contained area. Both distribution systems use the same stylus and mounts. The mounting systems paired with these dispensers allow them to be positioned in any type of environment by anyone.

In certain embodiments of the invention, the dispenser may be adjustable or programmable in order to allow for multiple styluses to be dispensed at a time with one input, for example, using a family setting and/or other safe higher volume setting. In certain examples, the adjusted setting may enable multiple rotations of a cam or other dispensing methodology to allow for more than one stylus unit to be dispensed at a time.

In other embodiments of the invention, the stylus may be comprised of a single material having conductive properties and touch sensitive functionality. The single material may be a composition material that may include hybrid blends, such as powdered metals in foam composite; carbon-based products in foam; a solid piece of silicone, or a conductive rubber mix.

In certain other embodiments a packaged disinfectant wipe is included within the stylus body.

Although the foregoing examples have been described in some detail for purposes of clarity of understanding, the invention is not limited to the details provided. There are many alternative ways of implementing the invention and the disclosed examples and embodiments are illustrative and not restrictive. The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Many other modifications and applications of the principles of the invention will be apparent to those skilled in the art and are contemplated by the teachings herein. Accordingly, the scope of the invention is limited only by the claims.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A personal protective equipment device for enabling contact with a remote surface, said device comprising:
    a graspable body portion adapted to held by a human hand; and
    a tip coupled to said body portion, said tip adapted for contact with said remote surface
    without the need for direct bodily contact from an individual;
    wherein said body portion is a hollow cylindrical tube having a metallic layer inside of said cylindrical tube, said metallic layer electrically coupled to said tip;
    wherein said tip is adapted to enable activation of a screen of a touch activated technology surface device;
    wherein said cylindrical tube is made from multiple layers of cardboard, said cylindrical tube having at least one relatively thicker structural layer and at least one thinner finish outer cardboard layer.

2. The device of claim 1, wherein said tip has an approximate outer radius of 0.133 inches.

3. The device of claim 1, wherein said body portion is made from a biodegradable material selected from the group consisting of: polylactic acid, polyglycolide, polybutylene succinate, polycaprolactone, polybutyrate adipate terephthalate, polyhydroxyalkanoate, cork, wood, ceramic, bamboo and wheat, paper, cardboard and other wood-based composites.

4. The device of claim 1, wherein said hollow tube further includes a disinfectant wipe included therein.

5. The device of claim 1, further including a dispenser unit for use in combination with said device, wherein multiple devices are loadable into said dispensing unit and said dispensing unit releases at least one device to a user after activation of the dispensing unit.

6. The device of claim 5, wherein said dispenser unit is motion activated.

7. The device of claim 5, wherein said dispenser unit uses an elastic energy system.

8. The device of claim 1, wherein said tip is made from a biodegradable material selected from the group consisting of: polylactic acid, polyglycolide, polybutylene succinate, polycaprolactone, polybutyrate adipate terephthalate, polyhydroxyalkanoate, cork, wood, ceramic, bamboo and wheat.

9. The device of claim 1, wherein said tip is adapted for use with devices selected from the group consisting of: Kiosks, Vending, Payment Terminals, ATMs, Elevators, Voting booths and Tablets.

10. The device of claim 1, wherein said device is a single use disposable device.

11. The device of claim 1, wherein said relatively thicker cardboard layer includes two cardboard layers having an approximate thickness of 0.005 inches and said outer cardboard layer having an approximate thickness of 0.002 inches.

12. A system for enabling distanced contact with a surface at a touch activated technology surface location, said system comprising:

one or more stylus units, said stylus units having at least one end adapted to be operational with a screen of a touch activated technology surface wherein stylus units include a hollow cylindrical tube having a metallic layer as part thereof, said metallic layer electrically coupled to said tip, wherein stylus units include a hollow cylindrical tube having a metallic layer as part thereof, said metallic layer is electrically coupled to said tip, wherein said cylindrical tube is made from multiple layers of cardboard, said cylindrical tube having at least one relatively thicker structural layer and at least on thinner finish outer cardboard layer;

a dispenser for dispensing said stylus units at least one at a time from said dispenser, wherein a dispenser user is dispensed at least a single stylus unit in response to activation of said dispenser, said dispenser loadable with multiple ones of said stylus units.

13. The system of claim 12, wherein stylus units include a hollow cylindrical tube having a metallic layer as part thereof, said metallic layer electrically coupled to said tip, wherein said cylindrical tube is made from multiple layers of cardboard, said cylindrical tube having at least one relatively thicker structural layer and at least one thinner finish outer cardboard layer.

14. The system of claim 12, wherein said dispenser unit is a powered device utilizing motion activation.

15. The system of claim 12, wherein said dispenser unit uses an elastic potential energy system.

16. The system of claim 12, wherein said stylus includes a body portion having a hollow cylindrical tube wherein said body portion is made from a biodegradable material selected from the group consisting of: polylactic acid, polyglycolide, polybutylene succinate, polycaprolactone, polybutyrate adipate terephthalate, polyhydroxyalkanoate, cork, wood, ceramic, bamboo and wheat.

17. A method of preventing germ spread at a location where touch activated technology surface devices are utilized, said method comprising the steps of:

providing one or more stylus units, said stylus units having at least one end adapted to be operational with a screen of said touch activated technology surface devices;

providing a dispenser at said point of sale location for dispensing said stylus units one at a time from said dispenser, wherein a dispenser user is dispensed a single stylus unit in response to activation of said dispenser, said dispenser loadable with multiple ones of said stylus units.

18. The device of claim 1, wherein said device is enclosed within an individual container, said container operable to prevent germ contamination of said device prior to removal.

19. The device of claim 18, wherein said container is a sealed plastic wrap.

20. The method of claim 17, wherein said stylus units include a hollow cylindrical tube having a metallic layer as part thereof, said metallic layer electrically coupled to said tip, wherein said cylindrical tube is made from multiple layers of cardboard, said cylindrical tube having at least one relatively thicker structural layer and at least one thinner finish outer cardboard layer.

21. The system of claim 12, wherein said system is adjustable to dispense more than one stylus at a time.

22. The system of claim 12, wherein the stylus is comprised of a single material having conductive properties and touch sensitive functionality.

23. The system of claim 22, wherein material is selected from the group consisting of: powdered metals in foam composite, carbon-based products in foam, silicone, and a conductive rubber mix.

* * * * *